Jan. 30, 1968  J. P. MARINO  3,366,840
GROUND FAULT PROTECTIVE APPARATUS
Filed Oct. 22, 1965
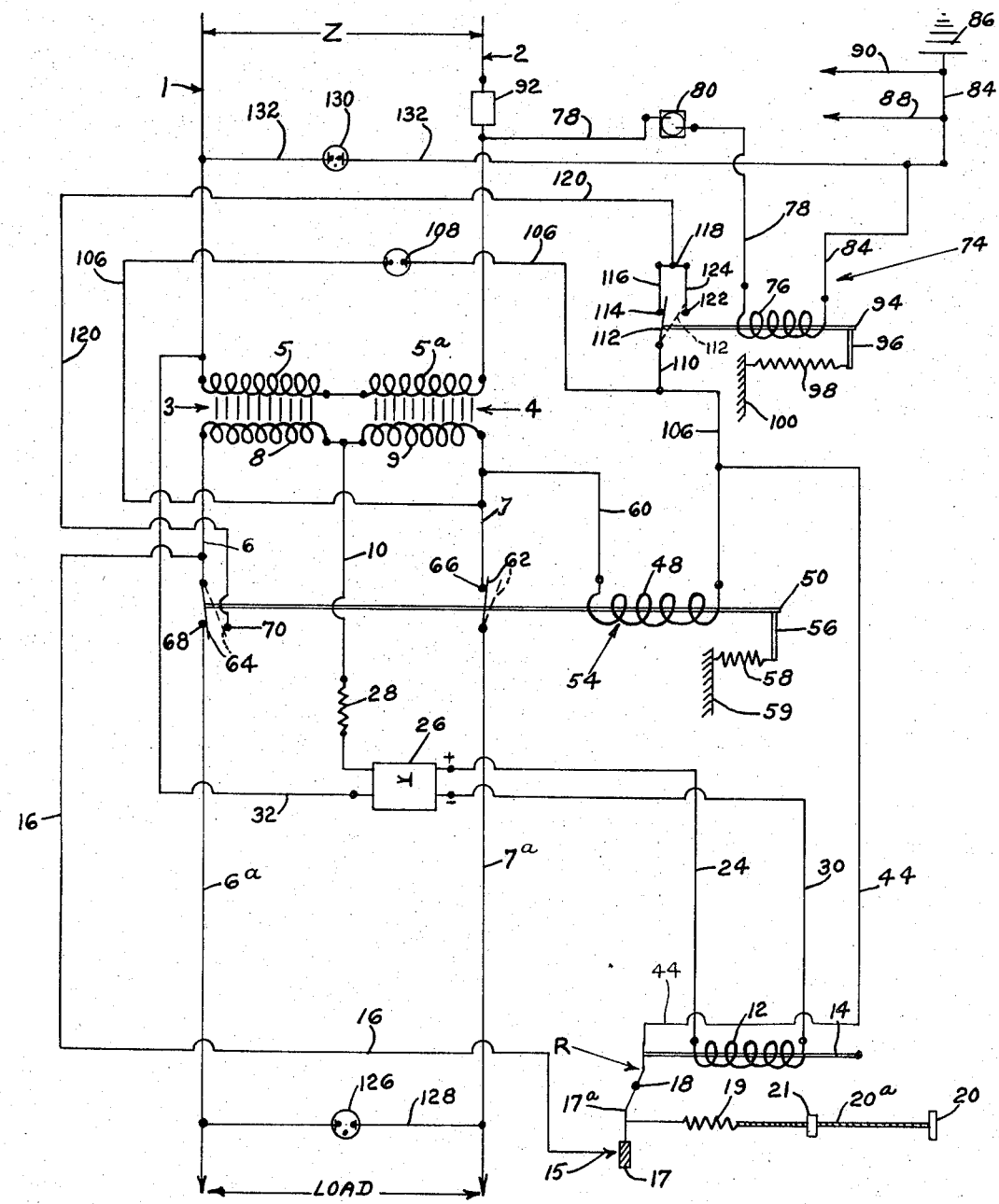
INVENTOR.
Joseph P. Marino
BY Harold E. Cole
Attorney United States Patent Office 3,366,840
Patented Jan. 30, 1968

3,366,840
GROUND FAULT PROTECTIVE APPARATUS
Joseph P. Marino, Lincoln, R.I., assignor to Electronic Instruments Corporation, Lincoln, R.I., a corporation of Rhode Island
Filed Oct. 22, 1965, Ser. No. 500,824
7 Claims. (Cl. 317—18)

This invention relates to apparatus to automatically control an electrical circuit.

Reference is made to my pending patent applications Ser. No. 340,367 filed Jan. 27, 1964, now Patent Number 3,319,124, and Ser. No. 371,629 filed June 1, 1964 now Patent Number 3,319,122.

One object of my invention is to provide improved apparatus that automatically discontinues the electrical supply to a tool or other power consuming means when an electrical fault to ground occurs in an electrical system that results from interruption of the normal supply of electrical current.

Another object is to avoid the use of mechanical elements as far as possible by substituting electrical circuits, in effecting the opening and closing of switches necessary to accomplish the desired result and also to reset my apparatus.

A further object is to provide said improved apparatus that will be operative to keep an electrical circuit open under circumstances when an operator fails to follow instructions for using my apparatus, or uses it incorrectly, or more than one fault occurs.

A still further object is to provide apparatus that is as simple as possible, is certain in operation and can be made at a relatively low price.

The foregoing and other objects which will appear as the nature of the invention is better understood, may be accomplished by a construction, combination and operative arrangement of parts such as is disclosed by the drawing. The nature of the invention is such as to render it susceptible to various changes and modifications, and therefore, I am not to be limited to the construction disclosed by the drawing, nor to the particular parts described in the specification; but am entitled to all such changes therefrom as fall within the scope of my claims.

In the drawing:

The drawing is a diagrammatic view of my apparatus, including the electrical system in normal position.

As illustrated, the usual electrical supply or primary leads or conductors 1 and 2 are connected to a source of electrical supply not shown. Leads 1 and 2 are respectively the ground and line sides of a single phase extending electrical system. The line sides thereof are 6 and 7 and the load sides 6a and 7a. An ordinary transformer 3 has a primary winding 5, and a saturable transformer 4 has a primary winding 5a that is connected in series with said primary winding 5. The core of transformer 4 will be moderately saturated over the range of applied voltages in supply leads or conductors 1 and 2 so that there will be a constant voltage output in secondary or load leads 6a and 7a which latter are connected to secondary windings 8 and 9 of said transformers 3 and 4 respectively.

Said secondary windings 8 and 9 are connected to a neutral center tap lead 10 and are poled so as to oppose each other, and saturable transformer 4 develops most of the secondary voltage.

When applied alternating voltage amplitude varies across supply leads 1 and 2, as may occur when loads are either supplied or removed from lines feeding said supply leads, the division of voltage between the transformers 3 and 4 changes with the latter taking proportionately less of the total. The resultant secondary voltage in load leads 6a and 7a become more nearly equal and voltage values in these load leads 6a and 7a and center tap 10 will remain substantially constant over an appreciable range of voltages applied to supply leads 1 and 2.

A variable sensitive relay apparatus R includes coil 12 with a plunger 14, stationary contact element 15 connected to a conductor 16 and through a switch contact arm 64, later described, to secondary lead 6. A conductor arm 17a carries a movable switch contact member 17. A pivotal element 18 is connected to said conductor arm 17a. Preferably attached to said arm 17a is a mechanical tension spring 19 connected to a pivotal element 18. An adjusting thumb-screw 20 is attached to a screw-threaded member 20a connected to said arm 17a and on which is a screw-threaded, locking member 21. The degree of tension desired on said spring 19 is effected by adjusting said member 20a in this well known arrangement.

Said coil 12 is connected by a conductor 24 to the positive terminal of a solid state, full-wave rectifier 26, thence to a fixed value resistor 28 that is connected to center tap lead 10. Said coil 12 is also connected to a conductor 30 that is connected to the negative terminal of said rectifier 26. A conductor 32 extends from said rectifier 26 to conductor 1 and thence to primary windings 5 and 5a and to conductor 2.

A conductor 44 connects with disconnect apparatus 54 having a disconnect coil 48 with a plunger 50. To the latter is affixed a lever arm 56 attached to a tension spring 58 fixed to a support 59 to thus hold said plunger 50 under predetermined tension. A conductor 60 connects with said coil and to secondary line 7.

Fixed to said plunger 50 are movable switch contact arms 62 and 64 in secondary lines 7 and 6 respectively and which are normally closed. Contact arm 62 is adjacent a stationary contact member 66 in said secondary lead 7, and contact arm 64 is adjacent a stationary contact member 68 in said secondary lead 6. Another contact member 70 is fixed to a conductor 120 later referred to and said switch arm 64 is normally spaced therefrom, but adjacent thereto.

I provide reset circuitry 74 having a coil 76 connected to a conductor 78 that connects with said primary lead 2. A reset button 80 in said conductor 78 normally keeps this line open. Another conductor 84 also extends from coil 75 to a ground 86. A conductor 88 connects with conductor 84 and the latter also connects with a conductor 90. Conductors 88 and 90 extend to equipment grounds not shown.

A manual switch 92 is connected in primary lead 2. Said reset circuitry 74 has a plunger 94 connected to said coil 76 and from which a lever arm 96 extends that is attached to a tension spring 98 fastened to a support 100 to thus normally keep plunger 94 in predetermined position.

A conductor 106 connects with a movable contact 112, later described, and it has indicator lamp 108 therein and extends to secondary lead 7 and to said stationary contact 66. A conductor 110 connects contact 112 with conductor 106.

A stationary contact 114 is in a conductor 116 and said switch arm 112 normally contacts 114. This arm 112 opens only when resetting, later referred to, takes place. A conductor 116 extends from stationary contact 114 to a terminal 118 and connects with said conductor 120 which extends to said fixed contact member 70. Another contact member 122 is connected to a conductor 124 that connects with said terminal 118.

To provide a signal, such as an electric light, when the flow of electrical current to a power consuming device or circuit is normal, which current flows across secondary or load leads 6a and 7a, an indicator lamp 126 or other signal member is connected across said leads 6a and 7a through a conductor 128 connected thereto. In normal operation, a potential difference will exist across load leads 6a and 7a and electrical current will flow through conductor 128 and light indicator lamp 126 to indicate power is being supplied from said leads 6a and 7a in a normal manner.

To also provide a signal, such as an electric light, when the polarity of primary leads 1 and 2 are not in accord with the polarity of the usual alternating single phase electrical supply system to which it is connected, an indicator lamp 130 is connected by a conductor 132 that connects with said ground 86 and with supply lead 1. This conductor 132 is a continuation of conductor 84.

In operation, electrical current is supplied from a source, not shown, to supply leads 1 and 2 and thence to transformers 3 and 4. Leads 6 and 7, located in the line side of switch elements 62 and 64 respectively, and to secondaries 8 and 9 of transformers 3 and 4, cause current to flow through the normally closed switch contact elements 62 and 64 and thence to load leads 6a and 7a and to power consuming apparatus not shown.

In the event of an electrical fault or abnormality developing across either load lead 6a or 7a, such as the current flowing through the metal body of a power consuming tool or apparatus, an electrical current will also flow through center tap lead 10 of transformers 3 and 4 and through full wave rectifier 26. The positive component of the rectified alternating current will then flow through conductor 24, to coil 12, to conductor 30, to the negative side of rectifier 26, to conductor 32 and to supply lead 1 to thereby energize said coil 12. This will cause movement of plunger 14, movable arm 17a about pivotal element 18 to thereby cause contact of members 15 and 17, whereby they serve as a conductor.

Current therefore flows through conductor 16 affixed to the line side of switch contact element 64 through lead 6 from transformers 3 and 4. It also flows through conductor 44 to coil 48 and thence to conductor 60 that connects with secondary lead 7 located on the line side of switch element 62 to thus energize said coil 48. This moves plunger 50 to open position to thereby draw switch contact elements 62 and 64 away from stationary contact members 66 and 68 respectively and thence to open the usual closed circuit through load leads 6a, 7a, and to de-energize said coil 12, thereby interrupting the flow of current through center tap lead 10.

Said movement of switch contact element 64 brings it into contact with contact member 70 to thereby close a circuit that is normally open. Current now flows through conductor 120, to terminal 118, switch contact member 114 through normally closed switch contact element 112, to conductor 110, to conductor 46, to coil 48, to conductor 60, to lead 7 and thus keep said coil 48 energized thereby to hold contact elements 62 and 64 open.

Simultaneously current flows through lead 6, contact element 70, conductor 120, terminal 118, switch contact member 114 through normally closed contact element 112, to conductor 110, to conductor 106, to indicator lamp 108 which is illuminated, and thence to lead 7 to give an indication in a positive manner of an electrical fault or abnormality existing across loads either 6a or 7a.

Once the fault condition across either load lead 6a or 7a is eliminated, to reset my apparatus ready for normal use, the normally open reset button 80 is pressed to a closed circuit position. This establishes a circuit through conductor 78 to supply lead 2, through coil 76, conductor 84 and to ground 86. This energizes said coil 76 thus actuating plunger 94 resulting in moving switch contact element 112 into contact with contact member 122. This breaks the circuit through conductor 46 and thus de-energizes said coil 48 hence moving said contact elements 62 and 64 into engagement with said contact member 66 and 68 respectively, which restores the circuit through said secondary load line 6a and 7a to the work load.

What I claim is:

1. Electrical circuit control apparatus comprising two primary conductors adapted to be connected in a main power circuit, a neutral center tap conductor lead connected to said primary conductors, a first switch having a first movable contact member and connected to one of said primary conductors, a second switch connected to the other of said primary conductors, both said first and second switches being normally closed, a third switch contact member adjacent and normally spaced from said first switch movable contact member, disconnecting apparatus having a third switch normally open and actuating means operatively connected to said third switch adapted when electrically actuated to close said third switch, a third conductor connecting said actuating means and said center tap lead, a first electrical coil, lever means operatively connected to said first coil and to said third switch, a fourth conductor connected to said disconnecting apparatus third switch and to a said primary conductor, fifth conductor means connected to said first coil and to a said primary conductor, sixth conductor means connected to said first coil and to said center tap conductor lead, a second coil, a seventh conductor connecting said second coil to said third switch, an eighth conductor connecting said second coil to a said primary conductor, a ninth conductor connecting said seventh conductor to said primary conductor, lever means operatively connected to said second coil and to said first and second switches and adapted to open said latter two switches when actuated and to move said first movable contact member into contact with said third contact member, a first electrical terminal, a tenth conductor connecting said third contact member to said terminal, a fourth switch normally closed and having a movable contact member, a fourth switch contact member adjacent and normally spaced from said fourth switch movable contact member, an eleventh conductor connected to said first terminal and to said fourth switch contact member, a twelfth conductor connecting said fourth switch movable contact member to said ninth conductor, a third coil, a reset button normally open, a thirteenth conductor connecting said third coil to said reset button and to a said primary conductor, a fourteenth conductor connecting said third coil to a said primary conductor other than the last-mentioned one, and lever means operatively connected to said third coil and to said fourth switch movable contact member and adapted when actuated by said third coil to move said fourth switch movable contact member into contact with said fourth switch contact member.

2. Electrical circuit control apparatus as set forth in claim 1, and an indicator lamp connected to said eighth conductor and normally non-illuminated.

3. Electrical circuit control apparatus as set forth in claim 1, an electrical ground and a fifteenth conductor connecting said fourteenth conductor and said electrical ground.

4. Electrical circuit control apparatus as set forth in claim 1, and an indicator lamp connected to said fourteenth conductor and normally non-illuminated.

5. Electrical circuit control apparatus as set forth in claim 1, and spring means connected to said second coil lever means and normally keeping said second coil lever means in inoperative position.

6. Electrical circuit control apparatus as set forth in claim 1, and means connected to said first coil lever means and normally keeping said second coil lever means in inoperative position.

7. Electrical circuit control apparatus as set forth in claim 1, and means connected to said third coil lever means and normally keeping said third coil lever means in inoperative position.

References Cited

UNITED STATES PATENTS

| 2,844,765 | 7/1958 | Sosnoski | 317—18 |
| 2,999,189 | 9/1961 | Gerrard | 317—18 |
| 3,168,682 | 2/1965 | Moore et al. | 317—18 |
| 3,229,163 | 1/1966 | Rogers | 317—18 |

MILTON O. HIRSHFIELD, *Primary Examiner.*

R. V. LUPO, *Assistant Examiner.*